United States Patent
Koyama et al.

(10) Patent No.: US 8,765,242 B2
(45) Date of Patent: *Jul. 1, 2014

(54) PLASTIC FUEL TANK

(75) Inventors: Kazutake Koyama, Wako (JP); Masahiro Yonemura, Wako (JP); Yutaka Tabata, Wako (JP); Teruyuki Saitoh, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 441 days.

This patent is subject to a terminal disclaimer.

(21) Appl. No.: 12/959,415

(22) Filed: Dec. 3, 2010

(65) Prior Publication Data

US 2011/0155731 A1 Jun. 30, 2011

(30) Foreign Application Priority Data

Dec. 24, 2009 (JP) ................................ 2009-291882
Oct. 27, 2010 (JP) ................................ 2010-240589

(51) Int. Cl.
*B32B 1/02* (2006.01)
*B32B 27/20* (2006.01)
*B65D 6/02* (2006.01)

(52) U.S. Cl.
USPC ........................ 428/36.6; 428/35.7; 220/62.22

(58) Field of Classification Search
CPC .......... B32B 1/02; B32B 27/30; B32B 27/32; B32B 27/20; B60K 15/03177; B60K 2015/03046
USPC ................... 428/36.6, 35.7; 220/62.11, 62.22
See application file for complete search history.

(56) References Cited

U.S. PATENT DOCUMENTS

| | | | |
|---|---|---|---|
| 4,370,809 A | * | 2/1983 | Takahashi et al. ............. 30/381 |
| 5,608,165 A | | 3/1997 | Mozurkewich, Jr. |
| 5,618,599 A | | 4/1997 | Nulman et al. |
| 5,866,819 A | | 2/1999 | Albu et al. |
| 5,871,097 A | | 2/1999 | Shida et al. |
| 6,033,749 A | | 3/2000 | Hata et al. |
| 6,289,915 B1 | | 9/2001 | Nulman et al. |
| 7,600,652 B1 | | 10/2009 | Johansen |

FOREIGN PATENT DOCUMENTS

| | | |
|---|---|---|
| CN | 1172757 A | 2/1998 |
| DE | 10139782 A1 | 5/2002 |
| DE | 10214900 A1 | 4/2004 |
| EP | 1955887 A2 | 8/2008 |
| EP | 2018961 A1 | 1/2009 |
| JP | 51-013016 Y1 | 1/1976 |
| JP | 58-112954 A | 7/1983 |

(Continued)

OTHER PUBLICATIONS

Swiler, D. R. 2005. Pigments, Inorganic. Kirk-Othmer Encyclopedia of Chemical Technology (Aug. 2005).*

(Continued)

*Primary Examiner* — Erik Kashnikow
(74) *Attorney, Agent, or Firm* — Westerman, Hattori, Daniels & Adrian, LLP

(57) ABSTRACT

A plastic fuel tank having polyethylene layers is disclosed. The polyethylene layer positioned as the outermost layer of the plastic fuel tank is a high-density polyethylene layer admixed with an ultraviolet inhibitor for minimizing transmission of ultraviolet light.

3 Claims, 6 Drawing Sheets

(56) References Cited

FOREIGN PATENT DOCUMENTS

| | | | |
|---|---|---|---|
| JP | 03-293125 A | 12/1991 |
| JP | 2001-097053 A | 4/2001 |
| JP | 2004-052659 A | 2/2004 |
| JP | 2004-203199 A | 7/2004 |
| JP | 2004-529003 A | 9/2004 |
| JP | 2009-132297 A | 6/2009 |
| WO | 02/64366 A1 | 4/2004 |
| WO | 2007/146216 A1 | 12/2007 |

OTHER PUBLICATIONS

Extended European Search Report dated May 6, 2011, issued in corresponding European Patent Application No. 10252228.1.
European Search Report dated Apr. 29, 2011, issued in European Patent Application No. 10252227.3.
Japanese Office Action dated Nov. 1, 2011, issued in Japanese Patent Application No. 2009-291883.
Chinese Office Action dated May 29, 2012, issued in corresponding Chinese Patent Application No. 201010582889.0. (3 pages).

* cited by examiner

PLASTIC FUEL TANK

FIELD OF THE INVENTION

The present invention relates to a plastic or resinous fuel tank wherein a polyethylene layer is laminated via an adhesive plastic layer onto both sides of an ethylene/vinyl alcohol layer for preventing fuel seepage or permeation.

BACKGROUND OF THE INVENTION

In recent years, plastic fuel tanks have also come to be used in general-purpose engines and the like, and known plastic fuel tanks offering a possible solution with respect to environmental pollution are disclosed, for example, in JP-A 2004-52659.

FIG. 7 hereof shows the plastic fuel tank disclosed in JP-A 2004-52659.

Referring to FIG. 7, a coupling member 102 is mounted on a tank assembly 101 in a plastic fuel tank 100. The tank assembly 101 includes a barrier layer 103 constructed from an ethylene/vinyl alcohol copolymer for preventing fuel seepage; an innermost layer 104 laminated onto an interior side of the barrier layer 103, and constructed from polyethylene; and an outermost layer 105 laminated onto an exterior side of the barrier layer 103 and constructed from polyethylene. The fuel would seep to the exterior from inside the tank assembly 101, but is blocked by the barrier layer 103.

It is known that the ethylene/vinyl alcohol copolymer will degrade when exposed to ultraviolet light for a long period of time. For example, there have been instances in which the plastic fuel tank 100 used in general-purpose engines has been bleached by long exposure to ultraviolet light, and the barrier layer 103 constructed from the ethylene/vinyl alcohol copolymer is degraded by ultraviolet light. Specifically, a need exists for a plastic fuel tank that will prevent fuel seepage and be weather resistant with regard to ultraviolet light or the like.

SUMMARY OF THE INVENTION

It is therefore an object of the present invention to provide a plastic fuel tank that prevents fuel seepage and is weather resistant.

According to an aspect of the present invention, there is provided a plastic fuel tank including a tank assembly and a filler neck, which comprises: an ethylene/vinyl alcohol layer for preventing fuel seepage; an outermost polyethylene layer laminated onto one surface of the ethylene/vinyl alcohol layer; an innermost layer laminated onto another surface of the ethylene/vinyl alcohol layer; and the outermost polyethylene layer being a high-density polyethylene layer admixed with an ultraviolet inhibitor for minimizing transmission of ultraviolet light.

The outermost polyethylene layer minimizes the transmission of ultraviolet light, enabling degradation of the ethylene/vinyl alcohol layer or the like to be prevented, and weather resistance to be improved. As a result, it is possible to provide a plastic fuel tank that prevents fuel seepage and is weather resistant.

In addition, an ultraviolet inhibitor is admixed into the high-density polyethylene layer to color the layer, whereby the fuel from can be prevented from being degraded by the transmission of ultraviolet light. In particular, depending on the type of gasoline used as the fuel, the gasoline is sometimes discolored by gasoline seepage, but the present invention can prevent fuel discoloration and improve the appearance of the plastic fuel tank through which the fuel can be seen.

Preferably, the ultraviolet inhibitor is titanium oxide, which acts as a white colorant.

Generally, carbon black is effective in preventing aging of a polyethylene layer due to exposure to sunlight, but when the polyethylene layer is compounded with carbon black, the layer is colored black and the fuel remaining inside the tank assembly cannot be discerned from the outside. In light of this, with the present invention, the polyethylene layer is colored a light white by compounding with titanium oxide, allowing the remaining fuel to be discerned from the outside because the tank assembly can be seen through.

Desirably, the titanium oxide is added in a compounding ratio within a range of from 0.04 to 0.50 wt %.

In recent years, a continuous performance of five years or more is sometimes needed because of the requirements to limit fuel seepage. Weather resistance can be made to last for five years or more as long as the compounding ratio of titanium oxide is 0.04 wt % or more. As long as the ratio is 0.50 wt % or less, the high-density polyethylene layers are lightly colored, allowing the fuel remaining inside the tank assembly to be discerned from the outside. Specifically, it is possible to ensure that the remaining fuel will be visible and that the weather resistance can be maintained for five years or more.

In a preferred form, at least one colorless recycled polyethylene layer is interposed between the outermost layer and the innermost layer. Recycled polyethylene material is inexpensive, allowing the costs associated with the plastic fuel tank to be reduced. In addition, weather resistance can be maintained because the outermost layer and the innermost layer are layers compounded with titanium oxide. The term "colorless" refers to colorless or to an extremely light color that allows transmission of light.

The tank assembly is preferably molded integrally with the filler neck. Since there is no joint between the tank assembly and the filler neck, any concern that fuel will leak through the joint is eliminated. In addition, there is no need to produce the components of the filler neck separately, allowing the costs associated with the entire plastic fuel tank to be reduced.

The tank assembly is preferably provided to a lower part of a general-purpose engine. Only the side of the plastic fuel tank can be seen in a state in which the general-purpose engine is placed on the ground when the tank assembly is located in the lower part of the general-purpose engine. According to the present invention, the remaining fuel can be discerned from the side of the plastic fuel tank, making it possible to readily discern remaining fuel even when the tank assembly is located in the lower part of the general-purpose engine.

BRIEF DESCRIPTION OF THE DRAWINGS

A preferred embodiment of the present invention will be described in detail hereinafter with reference to the accompanying drawings, in which.

DETAILED DESCRIPTION OF THE PREFERRED EMBODIMENT

Figure 1:
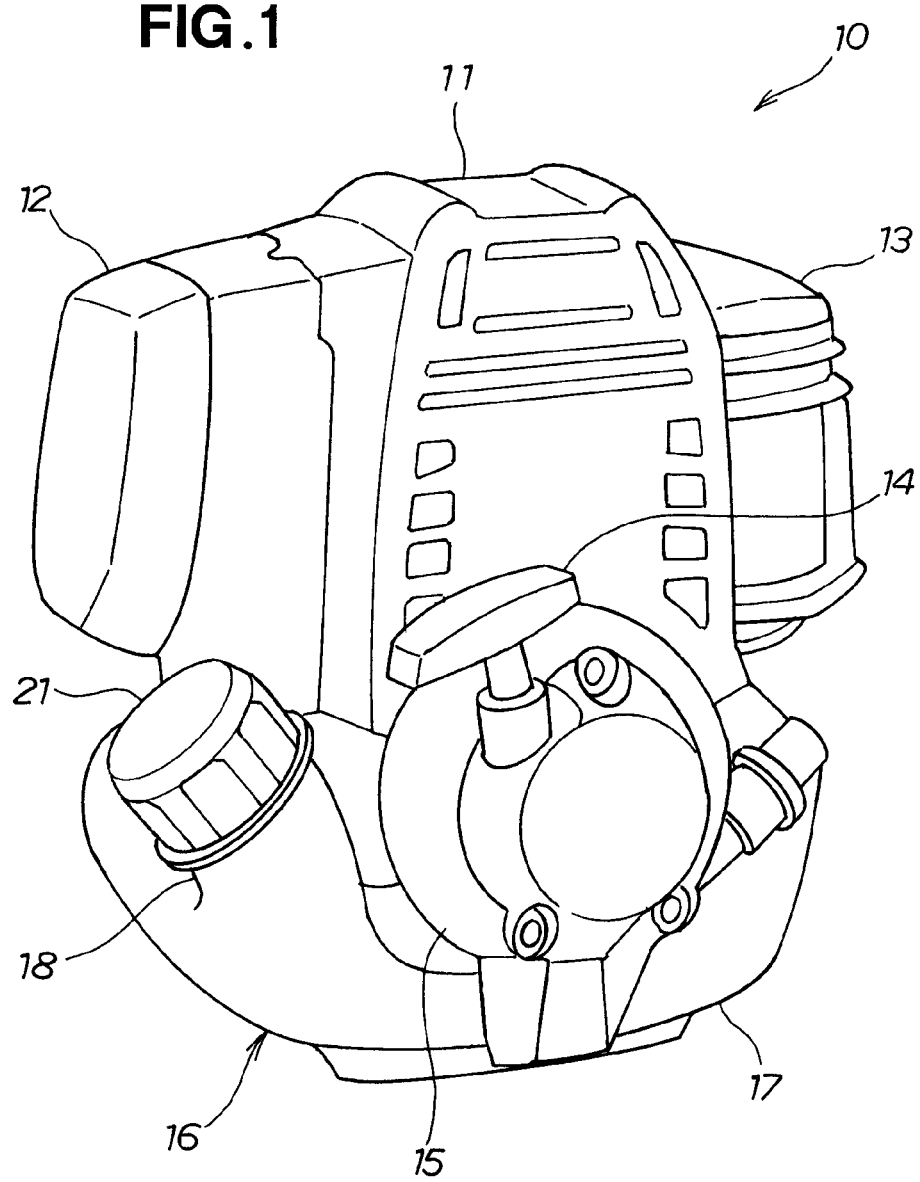
FIG. 1 is a perspective view showing a general-purpose engine having a plastic fuel tank according to the present invention.

As shown in FIG. 1, a general-purpose engine 10 includes an engine assembly 11, a suction part 12 provided to a side part of the engine assembly 11 and used to draw outside air into the engine assembly 11, an exhaust part 13 provided to a side part of the engine assembly 11 and used to discharge exhaust from the engine assembly 11 to the exterior, a recoil starter 14 provided to a lower part of the engine assembly 11 and used to start up the engine assembly 11, and a recoil starter cover 15 for covering the recoil starter 14.

The general-purpose engine 10 is also provided with a plastic fuel tank 16 for storing fuel in the lower part of the engine assembly 11. The plastic fuel tank 16 includes a tank assembly 17 for storing fuel, a filler neck 18 molded integrally with the tank assembly 17 and used to introduce fuel, and a filler cap 21 mounted on the filler neck 18 and used to block the filler neck 18.

Figure 2:
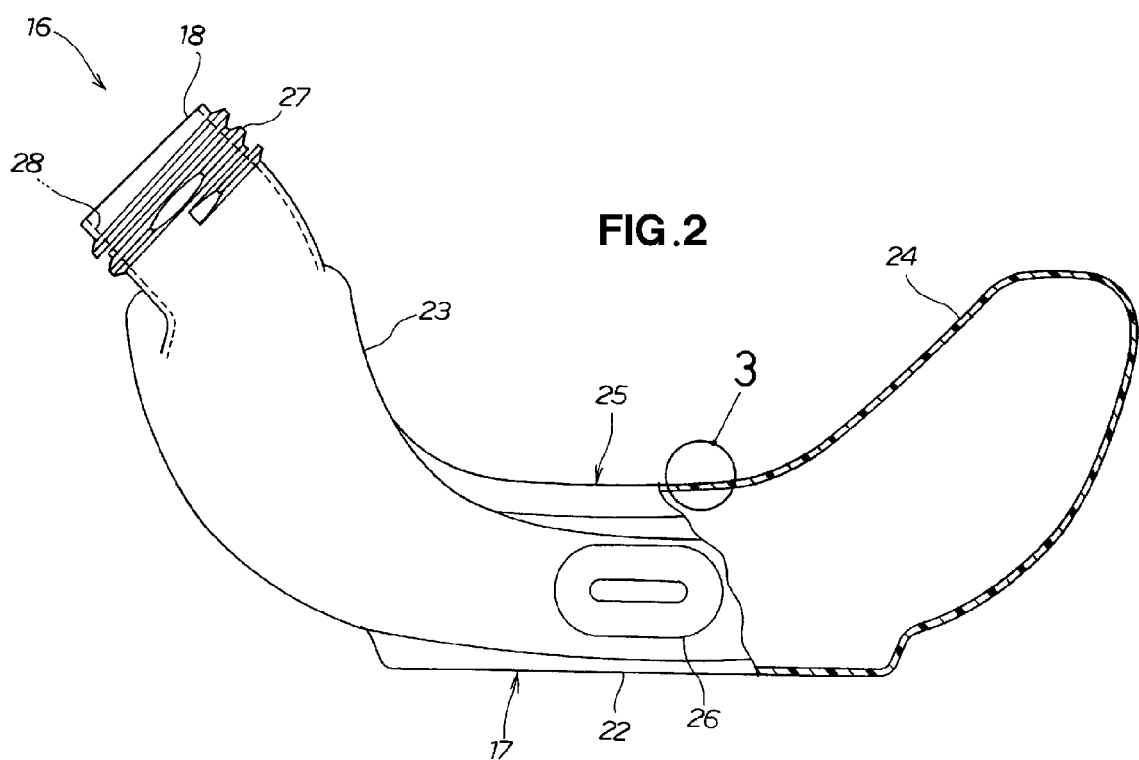
FIG. 2 is a front view showing, partially in section, the plastic fuel tank shown in FIG. 1.

As shown in FIG. 2, the tank assembly 17 of the plastic fuel tank 16 includes a center part 22, a first extending part 23 extending from the center part 22 to the filler neck 18, a second extending part 24 extending from the center part 22 to the side opposite the filler neck 18, and a depression 25 sunk into the vicinity of the center of the tank assembly 17.

A protrusion 26 protruding toward the front of the drawing is provided to the center part 22. The plastic fuel tank 16 is supported by inserting the protrusion 26 into the recoil starter cover 15 (FIG. 1).

A threaded part 27 is provided to the filler neck 18, and the filler cap 21 (FIG. 1) is fastened to the threaded part 27. The section from the tank assembly 17 of the plastic fuel tank 16 to an opening 28 of the filler neck 18 is molded as an integrated unit.

Due to the fact that the plastic fuel tank 16 has the depression 25, the plastic fuel tank 16 can be disposed on the lower part of the engine assembly 11 with the shape of the tank conforming to the contour of the engine assembly 11 (FIG. 1), allowing the entire general-purpose engine 10 (FIG. 1) to be made more compact. The presence of the first and second extending parts 23, 24 enables the capacity of the plastic fuel tank 16 to be increased.

The plastic fuel tank 16 of the present embodiment is produced by laminating together a plurality of layers. The laminated structure will be described next.

Figure 3:
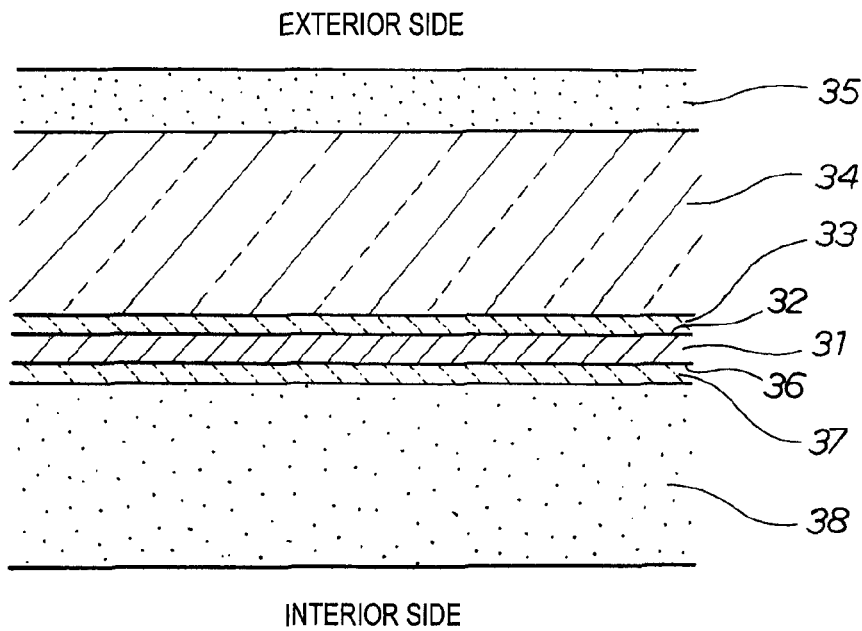
FIG. 3 is an enlarged view of region 3 of FIG. 2.

As shown in FIG. 3, the plastic fuel tank 16 includes an ethylene/vinyl alcohol layer 31 for preventing the fuel from seeping, an upper adhesive plastic layer 33 laminated onto an upper surface 32 of the ethylene/vinyl alcohol layer 31, a polyethylene layer 34 laminated onto the upper adhesive plastic layer 33 and formed of a colorless, recycled polyethylene material, a polyethylene layer 35 laminated onto the polyethylene layer 34 and used as the outermost layer, a lower adhesive plastic layer 37 laminated onto a lower surface 36 of the ethylene/vinyl alcohol layer 31, and a polyethylene layer 38 laminated onto the lower adhesive plastic layer 37 and used as the innermost layer.

The outermost polyethylene layer 35 is a high-density polyethylene layer 35 admixed with titanium oxide, which acts to minimize transmission of ultraviolet light and to color the layer white. The innermost polyethylene layer 38 is also a high-density polyethylene layer 38 admixed with titanium oxide for coloring the layer white so as to minimize transmission of ultraviolet light.

The coloring is not limited to white, and may be light blue, pink, beige, or another color as long as the fuel in the plastic fuel tank 16 can be discerned from the outside. For example, titanium oxide, azo yellow, iron oxide, and carbon black can be used for the coloring pigment when the tank is to be colored beige.

The innermost high-density polyethylene layer 38 need not necessarily be colored.

Color imperfections in the plastic fuel tank 16 molded by blow molding can be rendered less noticeable and the outer appearance improved when the innermost layer is colored.

The recycled polyethylene material of the recycled polyethylene layer 34 may be a mixture of adhesive plastic and an ultraviolet inhibitor, and may be a recycled material having recycled polyethylene as the main component.

The compounding ratio of titanium oxide in the high-density polyethylene layers 35, 38 will be described next.

Figure 4:
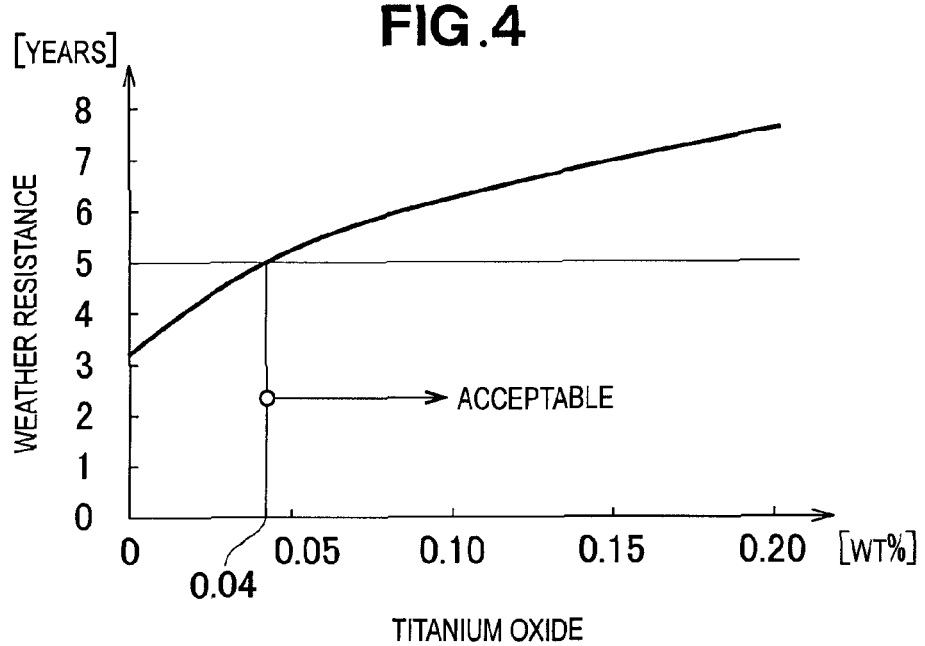
FIG. 4 is a graph showing a relationship between a compounding ratio of titanium oxide and weather resistance.

As shown in FIG. 4, the number of years that the weather resistance of the plastic fuel tank 16 (FIG. 2) can be maintained increases with increased compounding ratio of titanium oxide in the high-density polyethylene layers 35, 38 (FIG. 3).

A continuous performance of five years or more is sometimes needed because of the requirements to limit fuel seepage. Specifically, weather resistance can be made to last for five years or more when the compounding ratio of titanium oxide in the high-density polyethylene layers 35, 38 is 0.04 wt % or more.

Figure 5:
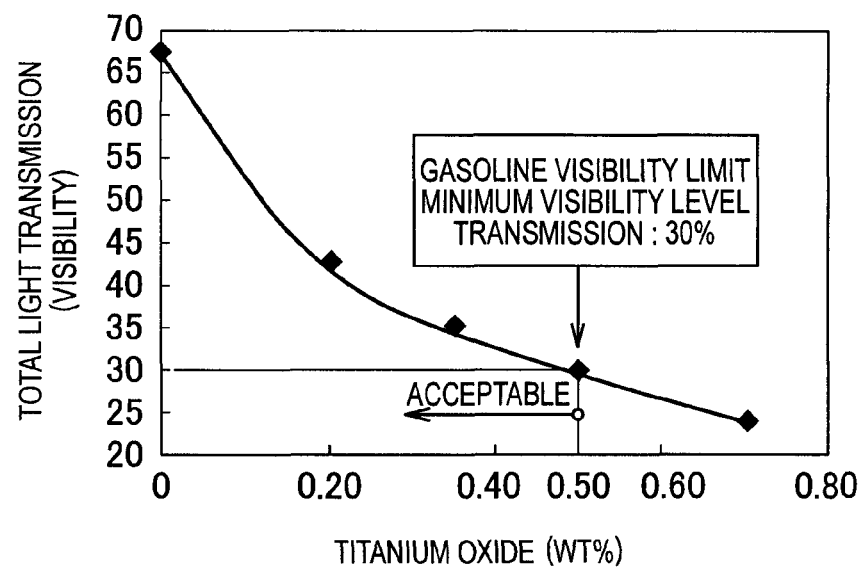
FIG. 5 is a graph showing a relationship between a compounding ratio of titanium oxide and visibility.

As shown in FIG. 5, the ability to see the fuel remaining in the plastic fuel tank 16 from the outside improves with reduced compounding ratio of titanium oxide in the high-density polyethylene layers 35, 38.

It is necessary to be able to discern the fuel remaining in the plastic fuel tank 16 of the general-purpose engine 10 (FIG. 1) from the outside. Specifically, it is possible to visually discern the remaining fuel when the compounding ratio of titanium oxide in the high-density polyethylene layers 35, 38 is 0.50 wt % or less.

As described with reference to FIGS. 4 and 5 above, the compounding ratio of titanium oxide in the high-density polyethylene layers 35, 38 is preferably within a range of from 0.04 to 0.50 wt %.

The operation of the above-described plastic fuel tank 16 will be described next.

Figure 6A:
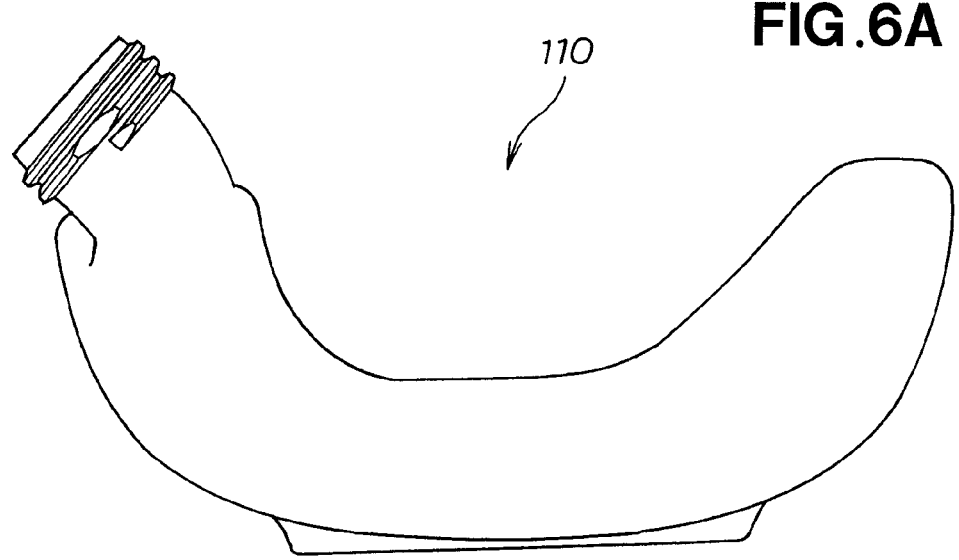
FIG. 6A is a front view of a fuel tank showing an example of poor visibility of remaining fuel.

The compounding ratio of titanium oxide in the outermost polyethylene layer of the plastic fuel tank 110 shown in FIG. 6A is greater than 0.50 wt %, and the remaining fuel cannot be discerned from the outside due to poor visibility.

Figure 6B:
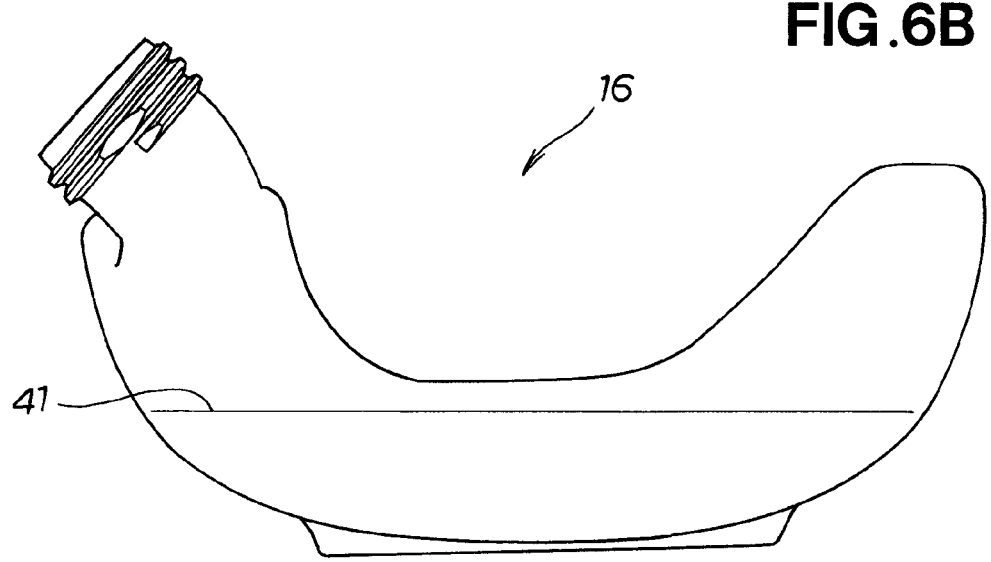
FIG. 6B is a front view of the plastic fuel tank according to the present embodiment.
Figure 7:
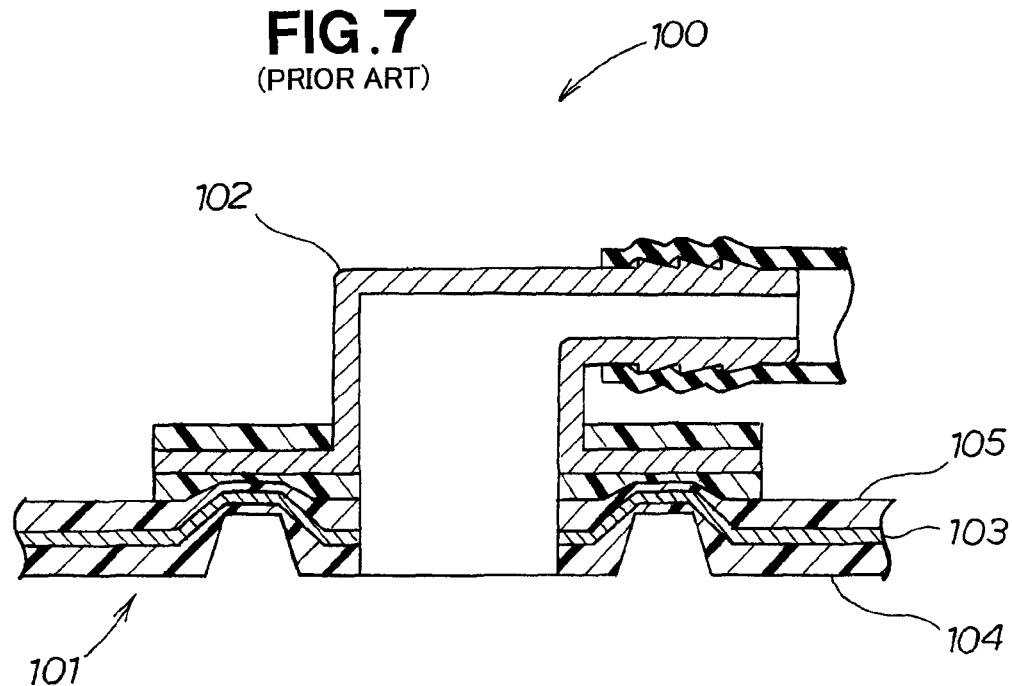
FIG. 7 is a partial enlarged cross-sectional view showing a conventional plastic fuel tank.

FIG. 6B shows the plastic fuel tank according to the present embodiment. The plastic fuel tank 16 of the present embodiment has good visibility, allowing the remaining fuel to be discerned from the outside. The symbol 41 indicates the level of remaining fuel seen from the outside.

As shown in FIGS. 1 to 3, in the plastic fuel tank 16 having the polyethylene layers 34, 35, 38 respectively laminated via the adhesive plastic layer 33 onto one surface 32 and the other surface 36 of the ethylene/vinyl alcohol layer 31 for preventing fuel seepage, the polyethylene layer 35 disposed as the outermost layer 35 of the plastic fuel tank 16 is a high-density polyethylene layer 35, and is a high-density polyethylene layer 35 in which an ultraviolet inhibitor is admixed for minimizing the transmission of ultraviolet light.

With this structure, the outermost polyethylene layer 35 minimizes the transmission of ultraviolet light, enabling degradation of the ethylene/vinyl alcohol layer 31 or the like to be prevented, and weather resistance to be improved. As a result, it is possible to provide a plastic fuel tank 16 that prevents fuel seepage and is weather resistant.

In addition, an ultraviolet inhibitor is admixed into the high-density polyethylene layer 35 to color the layer, whereby the fuel can be prevented from being degraded by the transmission of ultraviolet light. In particular, depending on the type of gasoline used as the fuel, discoloration is sometimes caused by the penetration of ultraviolet light, but the present invention can prevent fuel discoloration and improve the appearance of the plastic fuel tank 16 through which the fuel can be seen.

As shown in FIG. 3, the ultraviolet inhibitor is titanium oxide, which acts to color the layer white.

Generally, carbon black is effective in preventing aging of a polyethylene layer due to exposure to sunlight, but when the polyethylene layer is compounded with carbon black, the layer is colored black and it becomes impossible to discern the fuel remaining inside the tank assembly from the outside. In light of this, with the present invention the polyethylene layer 35 is colored a light white by compounding with titanium oxide, allowing the remaining fuel to be discerned from the outside because it is possible to see through the tank assembly.

The compounding ratio of titanium oxide in the high-density polyethylene layers 35, 38 is within a range of from 0.04 to 0.50 wt %, as shown in FIGS. 4, 5, and 6.

With this structure, weather resistance can be made to last for five years or more, as long as the compounding ratio of titanium oxide is 0.04 wt % or greater. As long as the ratio is 0.50 wt % or less, the high-density polyethylene layers 35, 38 are lightly colored, allowing the fuel remaining inside the tank assembly to be discerned from the outside. Specifically, it is possible to ensure that the remaining fuel will be visible, and to ensure weather resistance for five years or more.

At least one colorless recycled polyethylene layer 34 is interposed between the outermost layer 35 and the innermost layer 38, as shown in FIG. 3. Recycled polyethylene material is inexpensive, allowing the costs associated with the plastic fuel tank 16 to be reduced.

In addition, weather resistance can be maintained because the outermost layer 35 and the innermost layer 38 are layers compounded with titanium oxide.

The section from the tank assembly 17 of the plastic fuel tank 16 to the opening 28 of the filler neck 18 is molded as an integrated unit, as shown in FIG. 2.

With this structure, there is no joint between the tank assembly 17 and the filler neck 18, eliminating concern that fuel will leak through the joint. In addition, there is no need to produce the components of the filler neck 18 separately, allowing the costs associated with the entire plastic fuel tank 16 to be reduced.

The tank assembly 17 is provided to the lower part of the general-purpose engine 10, as shown in FIG. 1.

With this structure, only the side of the plastic fuel tank 16 can be seen in a state in which the general-purpose engine 10 is placed on the ground when the tank assembly 17 is located in the lower part of the general-purpose engine 10. According to the present invention, the remaining fuel can be discerned from the side of the plastic fuel tank 16, making it possible to readily discern remaining fuel even when the tank assembly 17 is located in the lower part of the general-purpose engine 10.

The plastic fuel tank 16 of the present invention was applied in this embodiment to a general-purpose engine, but the tank can also be applied to an electric generator, a cultivator, or other machines. The present invention may be applied to any typical machine that uses fuel or to the fuel tank itself.

The plastic fuel tank of the present invention is suitable for a plastic fuel tank in which a polyethylene layer is laminated via an adhesive plastic layer onto both sides of an ethylene/vinyl alcohol layer for preventing fuel seepage.

Obviously, various minor changes and modifications of the present invention are possible in light of the above teaching. It is therefore to be understood that within the scope of the appended claims the invention may be practiced otherwise than as specifically described.

What is claimed is:

1. A plastic fuel tank including a tank assembly and a filler neck, comprising:
    an ethylene/vinyl alcohol layer for preventing fuel seepage;
    an outermost polyethylene layer disposed on one side of the ethylene/vinyl alcohol layer; and
    an innermost layer disposed on another side of the ethylene/vinyl alcohol layer,
    wherein the outermost polyethylene layer and the innermost layer comprise a high-density polyethylene layer admixed with an ultraviolet inhibitor for minimizing transmission of ultraviolet light,
    wherein the ultraviolet inhibitor is titanium oxide which acts as a white colorant, and is added in a compounding ratio within a range of from 0.04 to 0.50 wt %, and
    wherein the tank assembly is provided to a general-purpose engine, the tank assembly having a protrusion protruding from a center part of the tank assembly, said protrusion being fittable into a recoil starter cover of the general-purpose engine.

2. The fuel tank of claim 1, further comprising at least one colorless recycled polyethylene layer interposed between the outermost layer and the innermost layer.

3. The fuel tank of claim 1, wherein the tank assembly is formed integrally with the filler neck.

\* \* \* \* \*